Feb. 16, 1960   R. T. GLASS   2,925,052
CONFECTION MACHINE
Filed Dec. 14, 1953   8 Sheets-Sheet 1

Fig. 1

Robert Taylor Glass
INVENTOR.

BY *[signatures]*
Attorneys

Feb. 16, 1960    R. T. GLASS    2,925,052
CONFECTION MACHINE
Filed Dec. 14, 1953    8 Sheets-Sheet 4

Robert Taylor Glass
INVENTOR.

BY
Attorneys

Feb. 16, 1960 R. T. GLASS 2,925,052
CONFECTION MACHINE
Filed Dec. 14, 1953 8 Sheets-Sheet 5

Robert Taylor Glass
INVENTOR.

BY
Attorneys

Feb. 16, 1960 R. T. GLASS 2,925,052
CONFECTION MACHINE
Filed Dec. 14, 1953 8 Sheets-Sheet 7

Robert Taylor Glass
INVENTOR.

Feb. 16, 1960

R. T. GLASS 2,925,052

CONFECTION MACHINE

Filed Dec. 14, 1953

Robert Taylor Glass
INVENTOR.

BY *Clarence A. O'Brien*
*and Harvey B. Jackson*
Attorneys

# United States Patent Office 2,925,052
Patented Feb. 16, 1960

2,925,052

CONFECTION MACHINE

Robert Taylor Glass, Austin, Tex.

Application December 14, 1953, Serial No. 398,100

6 Claims. (Cl. 107—8)

This invention relates to a machine for making confection, namely, ice cream novelties in which the novelty takes the form of a coated ice cream on a stick.

A primary object of this invention is to provide an improved confection making machine wherein the operations are all performed automatically and in properly timed relation, one to the other, such as to produce the novelties in the most rapid and economical manner.

Another object of this invention is to provide an improved confection making machine which utilizes first and second chain assemblies, each conveying the confection at various operating points for sequentially performing the operations of making the confection.

Another object of this invention is to provide an improved confection making machine in conformity with the foregoing objects wherein improved mechanism is utilized in transferring the confections from one chain assembly to another.

Another object of the invention is to provide a machine of the character set forth in which cold air is utilized in freezing the confection, the cold air being obtained either from a separate freezing unit or by placing a portion of the machine in a refrigerated vault or room.

Still another object of this invention is to provide an improved confection making machine wherein the drive mechanism for the chain assemblies and the various confection forming devices are all operated in properly timed relation, the system utilizing compressed fluid and having a novel valve control mechanism for properly interlocking the operations of the various devices.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 16:
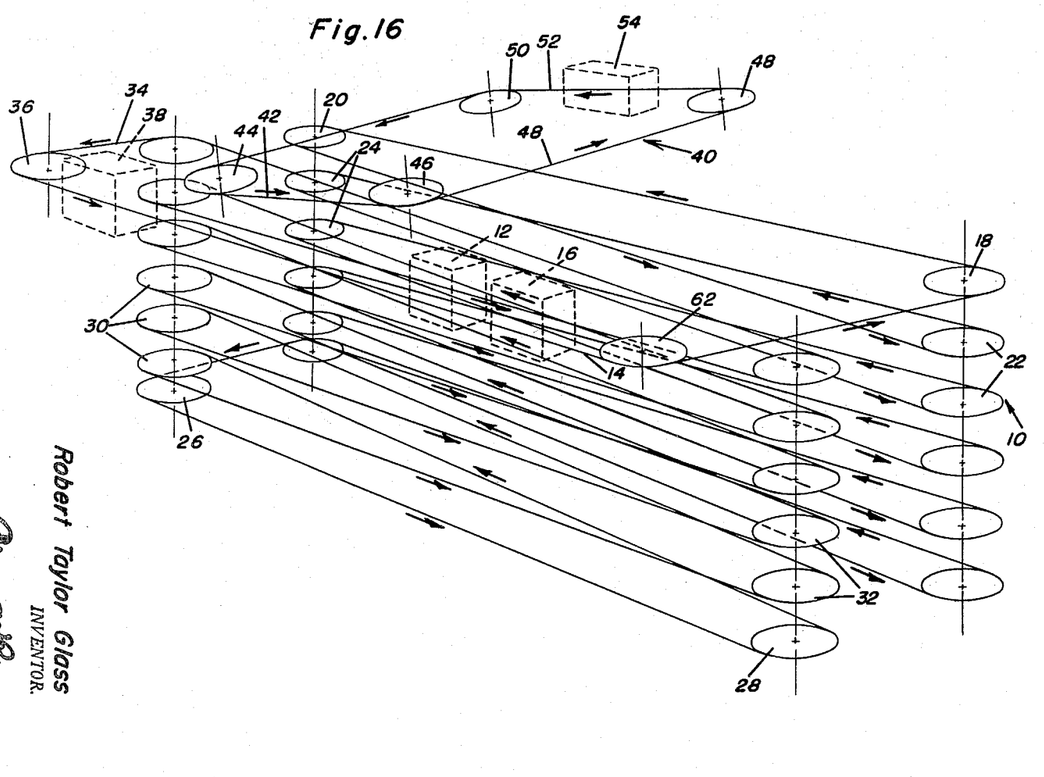
Figure 16 is a diagrammatic showing of the first and second chain assemblies and showing the various operating assemblies associated therewith.

Reference will first be had to Figure 16 wherein the entire assembly is shown diagrammatically. The machine consists essentially of two chain assemblies, each of which permits a certain series of operations to be performed. The first chain assembly is designated generally by the reference character 10 and consists of an endless chain entrained about a series of sprockets and being driven in a manner hereinafter set forth. For the purposes of description, the starting point will be considered to be at the mechanism 12 shown in dotted lines and which represents the filler mechanism. The filler, in itself, forms no part of this invention. Here, molds carried by the first chain are filled with ice cream mix, the flight of chain 14 carrying the molds thus filled past a mechanism 16 which is termed the sticker and which operates to place a stick or handle in the ice cream mix within the mold. As will be seen later, the filler and sticker are disposed exteriorly of the machine housing, the interior of which is maintained in a refrigerated state, in the neighborhood of −30° F. Within the housing and adjacent the four corners thereof are a series of stacked sprockets. The filled molds first pass over the uppermost sprocket 18 in one stack and then to the uppermost sprocket 20 in another stack. The chain then winds back and forth over the sprocket 22 in the one stack and the sprocket 24 in the other stack, progressively lowering during this operation. Upon reaching the lowermost sprocket in the second mentioned stack, the chain passes to the lowermost sprocket 26 in a further stack and then to the lowermost sprocket 28 in the remaining stack. In these latter two stacks, the chain progressively rises over the several sprockets 30 and 32 to substantially the original level and from the uppermost sprocket of the stack referred to as the further stack, the chain passes outwardly of the housing in the flight 34, over a sprocket 36 and through a suitable heater 38 wherein enough heat is applied to the individual molds to permit the frozen food or novelty to be removed therefrom by the second chain assembly designated generally by the reference character 40. The manner of operation of the transfer of the frozen food articles or novelties from the first to the second chain assembly will be described later, but suffice it to say at this point that the transfer is occasioned by the fact that the flight 42 of he second chain rises from the sprocket 44 to sprocket 46. The flight 48 passes through the freezing compartment from sprocket 46 to sprocket 48, both at the same level. This refreezes the outer surface of the ice cream which had become softened by passage through the heater 38, permitting easy removal from the molds. The second chain then passes downwardly from sprocket 48 to sprocket 50 in the flight 52 wherein the ice cream is coated with chocolate or the like by the dipper mechanism 54 and then back through the freezing chamber to harden the coating and once again over the sprocket 44. It should be here noted that the mechanism effecting the transfer in flight 42 also serves to release the finished novelty from the second chain, a suitable discharge chute being provided to receive the novelties thus released.

*Driving mechanism for first and second chain assemblies*

To explain the operation of the drive for the chain assemblies, reference is had to Figures 1, 2 and 7–9.

Figure 1:
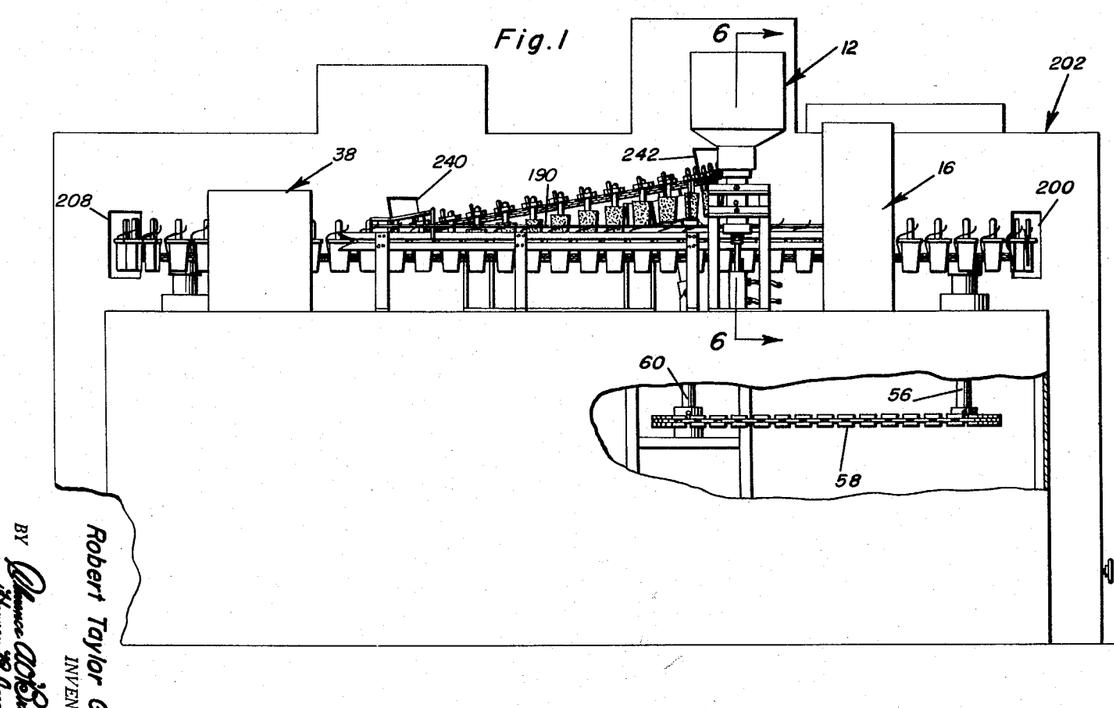
Figure 1 is a front elevational view of the machine with portions broken away to show the driving interlock between the first and second chain assemblies.
Figure 2:
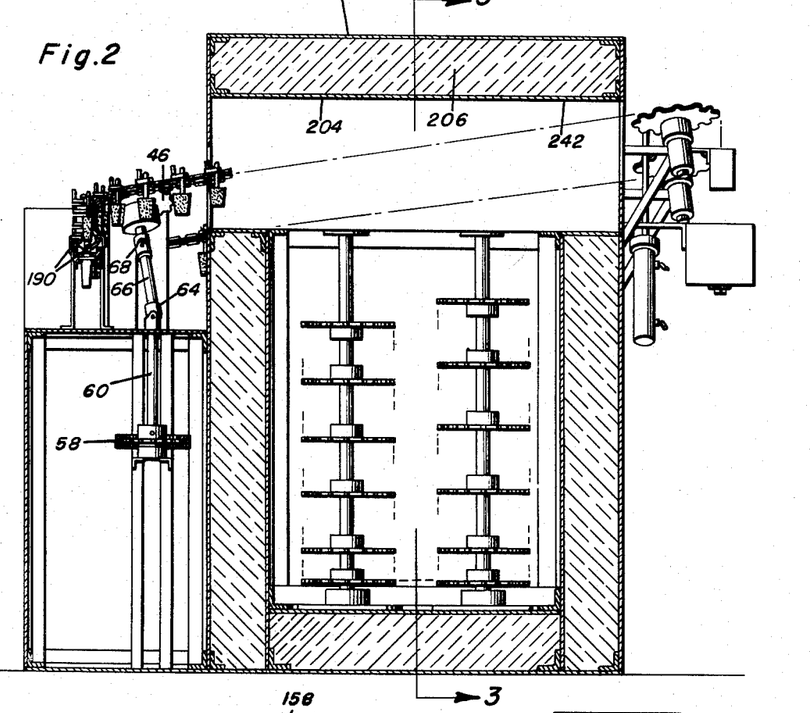
Figure 2 is a transverse section taken through the assembly showing the details of internal construction thereof.
Figure 3:
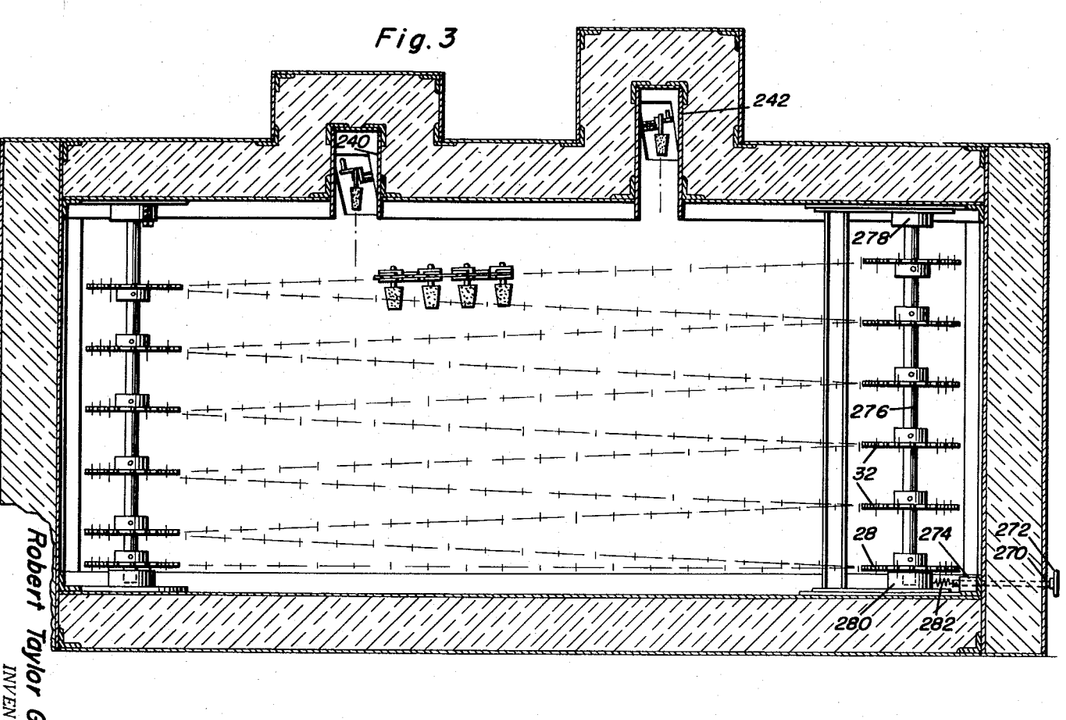
Figure 3 is a vertical section taken substantially along the plane of section line 3—3 in Figure 2.

Referring first to Figure 1, numeral 56 represents the main drive shaft, vertically arranged, the lower end of which is securely fastened to a sprocket over which a drive chain 58 is trained. The drive chain is also trained over a sprocket which is secured to a secondary drive shaft 60, also vertically arranged. The upper end of the first drive shaft 56 carries a drive sprocket 62 (see Figure 16) over which the first chain is trained and thus imparting drive thereto. On the other hand, the secondary drive shaft 60, since the previously mentioned sprocket 46 must necessarily be inclined, is connected through a universal joint 64 to an inclined shaft 66 driving this sprocket 46 through a further universal joint 68. In this manner, the two chain assemblies are driven in unison.

Figures 7, 8, 9:
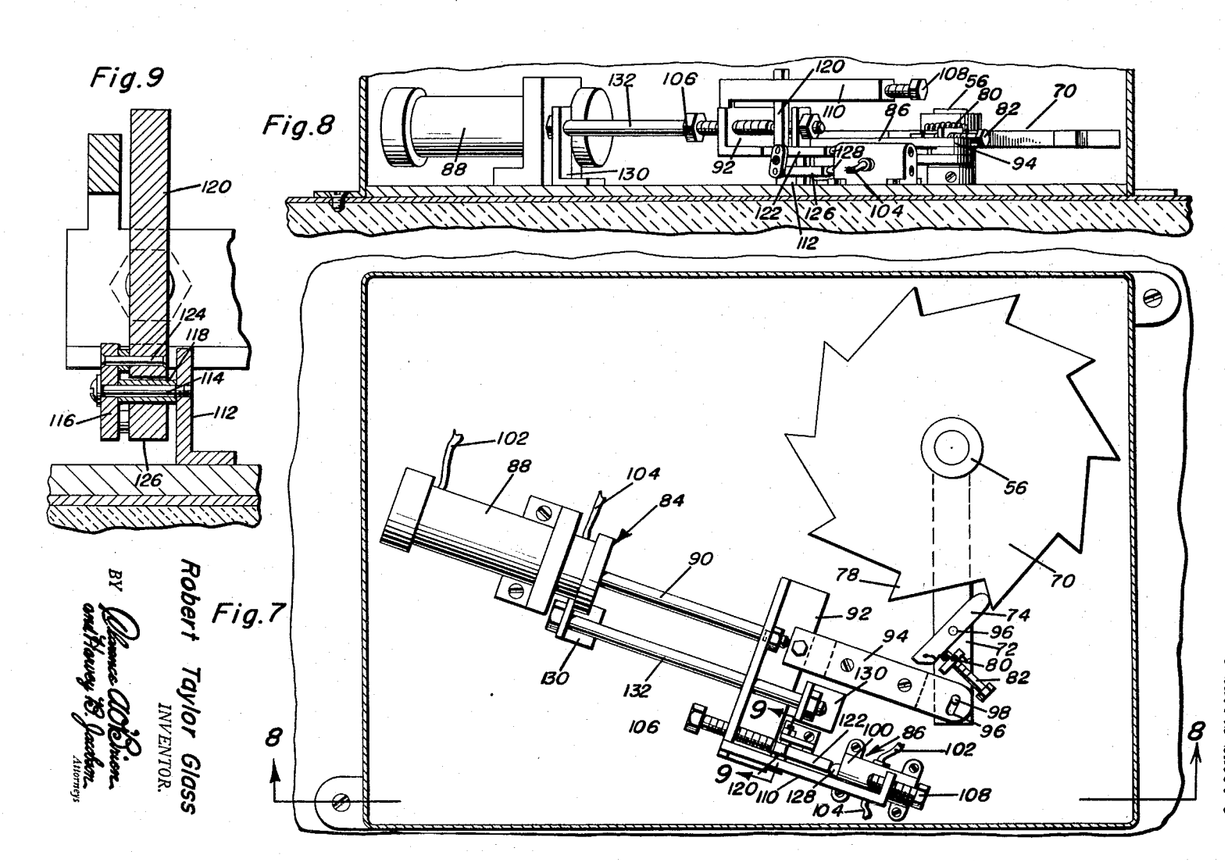
Figure 7 is a plan view of the driving assembly.
Figure 8 is a vertical section taken substantially along the plane of section line 8—8 in Figure 7.
Figure 9 is a transverse section taken substantially along the plane of section line 9—9 in Figure 7.

The mechanism for imparting motion to drive shaft 56 is shown in Figures 7–9 and consists of a ratchet wheel 70 feathered or otherwise suitably secured to shaft 56 and a pawl mechanism which includes the rocker arm 72 journaled for oscillation on shaft 56 and pivotally carrying adjacent its free end the pawl 74, the pin 76 serving this purpose. The pawl is urged normally into engagement with the ratchet teeth 78 by means of a suitable spring 80, an abutment member 82 being provided for limiting the spring urged position of the member. The abutment member may be adjustable as shown, as will be manifest.

For imparting oscillation to the rocker arm 72 and consequently step-by-step rotation of ratchet wheel 70 and drive shaft 56, the piston and cylinder assembly, designated generally at 84, and associated reversing valve mechanism 86 are provided. The piston and cylinder assembly consists of a cylinder 88 having connection at its opposite ends to a supply of compressed air or the like, the supply being regulated by the reversing valve mechanism 86. A piston is reciprocated in the cylinder by the working fluid, and a piston rod 90, extending from the cylinder, rigidly carries an angle member 92 at its free end. A connecting rod 94 is rigidly affixed to member 92 and its free end is slotted, as at 96, for receiving a pin 98 on the rocker arm. Thus, as the piston rod 90 is reciprocated, the rocker arm is oscillated.

To selectively connect the opposite ends of cylinder 88 to the working fluid, the reversing valve 100 is provided with two outlet lines, 102 and 104, as well as an inlet line directly connected to the source of working fluid. The operation of the valve is such that as one outlet line is connected to the source, the other is exhausted.

The mechanism for operating the reversing valve in proper timed relation consists of a pair of screw members 106 and 108, the former of which is directly connected to the member 92 and the latter of which is connected to an extension 110 of this member. A bracket 112 is secured to the machine and carries a horizontal pivot pin 114 journaling a crank 116 thereon, the crank being spaced from the bracket by the sleeve 118. An L-shaped member having an upstanding arm portion 120 and a horizontal actuating arm 122 is rigidly affixed to the upper end of the crank 116 as by a fastener 124. The lower end of the crank 116 has a further actuating arm 126 rigidly affixed thereto. These two actuating arms are adapted to selectively engage and actuate, one to the exclusion of the other, the corresponding plunger 128 of the valve operator to control the inlet or exhaust of one or the other of the lines 102 or 104.

A pair of brackets 130 carry a guide rod 132 received through an aperture in the member 92 to properly guide such member in a manner which will be obvious.

*Construction of the molds*

Figure 13:
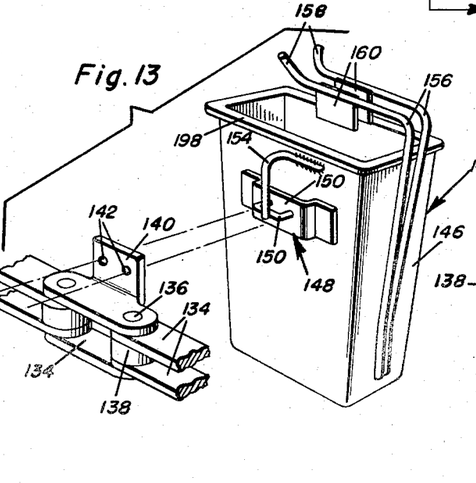
Figure 13 is an exploded perspective view showing a portion of the chain and one of the molds to be attached thereto.
Figure 14:
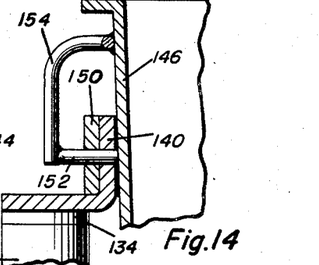
Figure 14 is a vertical section taken through the chain and associated mold.

Referring now more particularly to Figures 13 and 14, the construction of the first chain and associated mold assemblies will be observed. The chain itself is formed with separate link plates 134 and the usual connecting pins 136 and spaces 138. However, at predetermined spaced points along the chain, the uppermost links are formed with upstanding ears 140 having a pair of spaced apertures 142 therein. These ears form the means for connecting the molds 144 to the chain.

The molds themselves consist of a main body portion 146 having a U-shaped strap 148 secured to one side thereof, the strap being secured at its opposite end portions to the main body of the mold and with its intermediate portion 150 spaced therefrom. The intermediate portion is provided with a pair of apertures spaced identically with the apertures 142 in ears 140 and a U-shaped locking element 152 has its legs received in the apertures in both the ears and the straps to secure the mold to the ears, see particularly Figure 14. A spring finger 154 is secured at one end to each mold body and its opposite end overlies the bight portion of the locking element, maintaining this member in proper locking position while at the same time permitting withdrawal thereof for the purpose of removing the mold.

The molds are also provided with a pair of clip arms 156 having their free ends overlying the open tops of the molds and disposed at their extreme ends in upwardly inclined, divergent relation. Paddles 160 are secured to these clip arms adjacent their free ends such as to frictionally engage a novelty stick therebetween in a manner which will be presently apparent.

*The filler*

Figure 6:
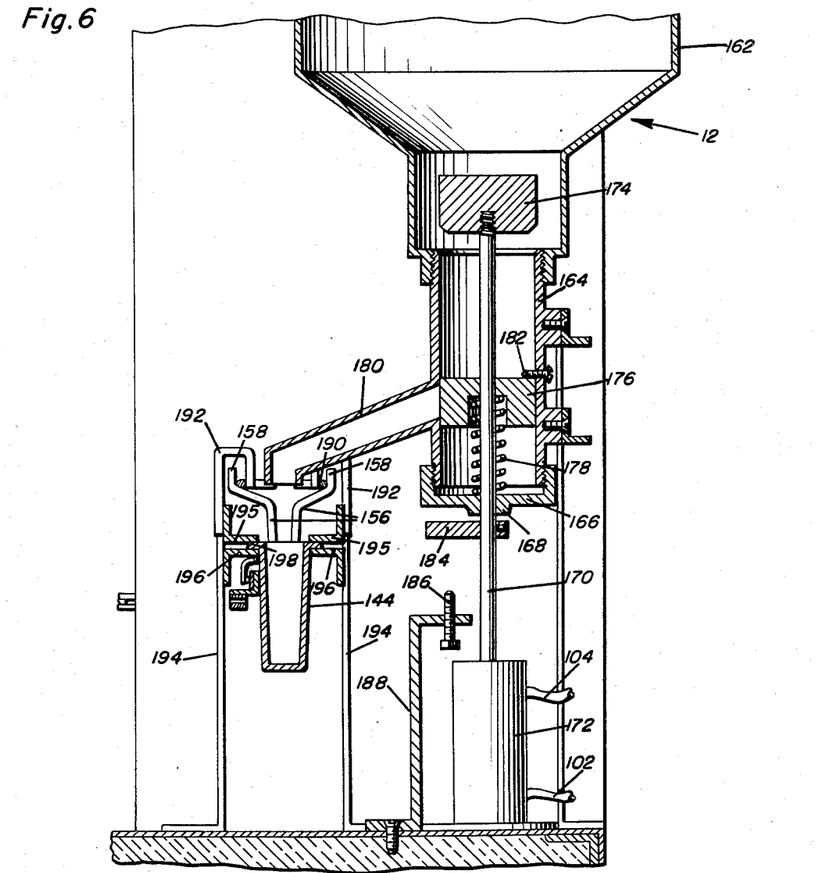
Figure 6 is a vertical section taken substantially along the plane of section line 6—6 in Figure 1.

Referring now more particularly to Figure 6, the construction of the filler will be apparent. The filler comprises a hopper 162 in which the mix is received for dispensing into the individual molds. The lower end of the hopper is open, and a feed cylinder 164 connects therewith in the manner shown. The bottom end of the feed cylinder is provided with a closure cap 166 having an apertured boss 168 through which the piston rod 170 extends for connection at its lower end to a piston reciprocable with the cylinder 172. The opposite ends of this cylinder are connected to extensions of the previously described lines 102 and 14. The connection is such that the mix will be dispensed when the rocker arm 72 and its pawl 74 are on the return stroke.

The rod 170 carries at its upper end the dispensing piston 174 and disposed within the cylinder, slidably receiving the rod, is a valve member 176 urged by spring 178 to a position closing the opening of filler spout 180, stop screw 182 being provided to properly locate the valve.

A movable stop member 184 is provided on rod 170 to limit the stroke of piston 174 by engagement between the closure cap 166 and an adjustable screw 188 threadedly received in bracket 189.

In this manner, when the piston 174 is forced downwardly under action of the piston rod connected thereto, the valve member will be forced down in opposition to its spring so as to uncover the spout opening and permit the ice cream mix to be forced outwardly therefrom and into the associated mold. The piston 174 in its uppermost position projects into the hopper and permits the ice cream mix to flow downwardly into the cylinder wherein the valve member prevents the ice cream mix from running out of the spout until the dispensing operation begins.

During this operation, it is desirable to spread the clip arms 156 and guide the molds to prevent undue strain on the ears 140 while these arms are being spread. For the purpose of spreading the arms, the pouring spout is straddled by the cam rails 190 supported by the brace rods 192 which are preferably of substantially inverted J-shape, as shown. The cam rails engage between the divergent free ends 158 of the clip arms 156 and force them apart as the molds under consideration advance.

Figure 4:
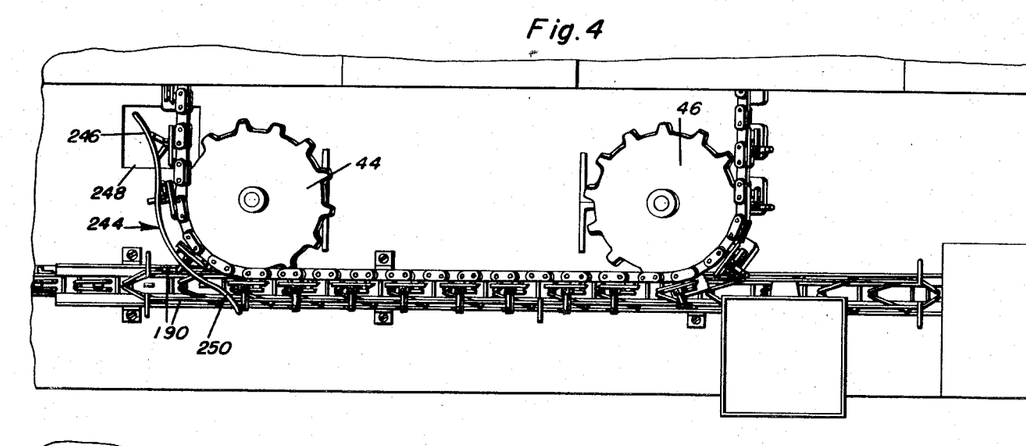
Figure 4 is an enlarged plan view showing a portion of the front part of the machine.

The support members 194 disposed on opposite sides of the chain and carrying the rod 192 also are provided with elongated upper and lower angle members 195 and 196 which receive the peripheral mold flange 198 therebetween, as will be apparent, thus relieving the ears 140 of twisting strain when the clip arms are spread apart under action of the camming ring. In this respect, it is to be understood that the cam rails mutually converge at their opposite ends, as shown most clearly in Figure 4, and extend from the pulling station, hereinafter described, and the sticker.

The sticker

The construction of the sticker forms no part of this invention. However, the operation of this device is such as to dispose a novelty stick in proper timed relation to the advance of the molds, between the paddles on the clip arms as the arms are disengaged from the cam rails with one end of the stick projecting into the ice cream mix in the mold. This operation is performed in response to reciprocation of a piston within a cylinder member, the opposite ends of the cylinder being connected to the operating lines 102 and 104 in a manner similar to the various other mechanisms operated by the working fluid.

Freezing

Referring once again to Figure 1, it will be seen that after the filled molds have passed from the sticker 16, they progress around the drive sprocket 62 through an opening 200 in the wall of the housing or freezing compartment 202. The walls of this compartment have spaced metallic inner and outer layers 204, see Figure 2, filled with suitable insulating material 206. The filled molds then progress over the tortuous path between the various stacks of sprockets as previously described and emerge through another opening 208 in the compartment wall at the opposite end from the opening 200.

The molds then pass through the previously described heater 38, the details of which form no part of this invention. The purpose of the heater is merely to supply sufficient heat to the molds so as to soften the outermost layer of ice cream of the confection so that the hereinafter described transfer between the first and second chain assemblies may be accomplished without pulling the sticks from the ice cream or otherwise destroying the novelty.

The second chain assembly

Figure 15:
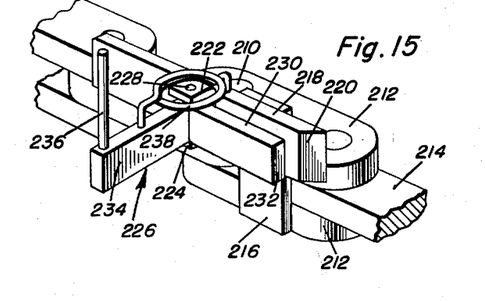
Figure 15 is a perspective view of a portion of the second chain assembly.

Referring now more particularly to Figure 15, the second chain is seen to consist of flexibly interconnected links, preferably connected by pins 210. The links are formed in pairs 212, each pair being interconnected by a single link 214. One of the links of each pair has an upstanding mounting 216 affixed thereto, and the mounting plate is provided at its upper end with a cross-bar 218 having its forward edge beveled as at 220. An intermediate portion of the cross-bar carries a bracket having upper and lower ears 222 and 224 between which a generally L-shaped member 226 is pivotally carried, the pivot pin 228 being provided for this purpose. The L-shaped member has a forwardly projecting arm portion 230 having a beveled forward edge 232 and has a lateral arm 234 provided at its free end with an upstanding cam post 236. A suitable spring 238 acts between the cross-bar 218 and the member 226 so as to normally urge the forward arm 230 towards the forward end of the cross-bar, in the manner shown in Figure 15. In this manner, the arm and cross-arm are adapted to engage the upper end of an ice cream stick therebetween.

Pulling operation

As explained in connection with Figure 16, the second chain assembly overlies the first and passes through the freezing compartment from side to side thereof, the various sprockets 44, 46, 48 and 50 being disposed exteriorly of the compartment. The compartment is provided with passages 240 and 242 for this purpose.

As the second chain passes out of the passage 240 and around sprocket 44, the discharging of finished novelties and pulling operations are effected.

This is accomplished by the cam track 244, one end 246 of which converges inwardly towards the chain to engage the cam posts 236 and release the sticks of completed novelties from between the arm 230 and cross-bar 218. In this respect, it will be noted that a suitable discharge chute 248 is provided below this portion of the cam device for receiving the novelties dropped and conveying them to a suitable discharge point.

Figure 5:
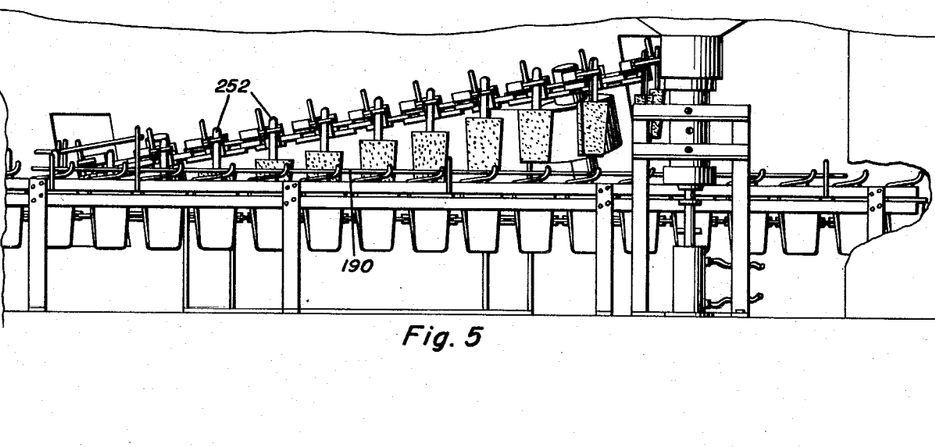
Figure 5 is an elevational view of the assembly shown in Figure 4.

As the molds progress, the arms are swung fully away from the cross-pieces until the posts are riding on the opposite end portion 250 of the cam track which diverges from the chain. At the precise point at which the second chain is in vertical register with the lower first chain, the arms 230 and cooperating cross-bars 218 will grasp the sticks 252 of the novelties. Since the second chain rises from sprocket 44 to sprocket 46, the novelties will be removed from the molds as shown in Figure 5.

The novelties then pass through the passage 242 in the freezing compartment to harden the softened outer surface of the novelties.

The dipper

Figures 10, 11, 12:
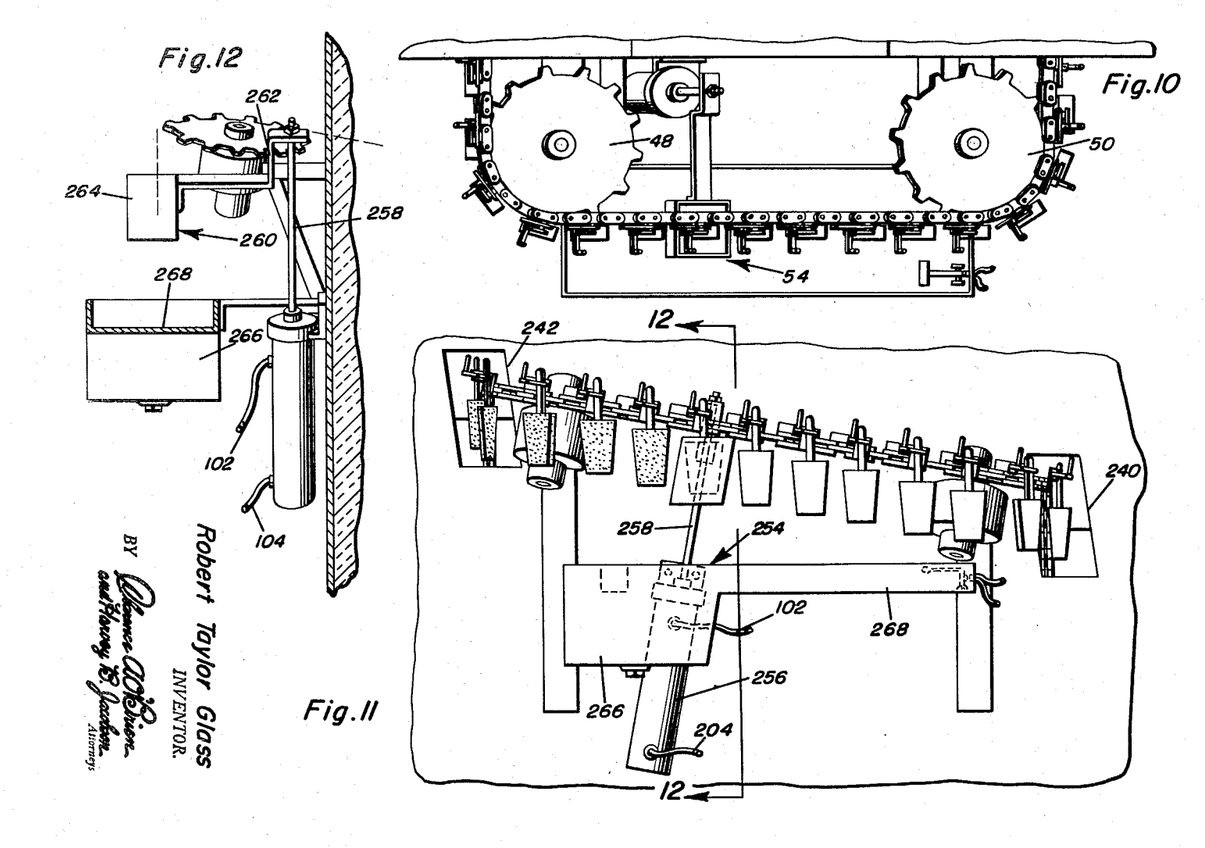
Figure 10 is a plan view of the rear portion of the machine.
Figure 11 is an elevational view of the assembly shown in Figure 10.
Figure 12 is a vertical section taken substantially along the plane of section line 12—12 in Figure 11.

Referring now more particularly to Figures 10–12, it will be seen that as the novelties pass out of the passage 242 of the freezing compartment to the rear side of the machine, they pass downwardly from sprocket 48 to sprocket 50 past the dipper mechanism 54.

The dipper consists essentially of a trough 254 holding a reserve of coating material in liquid form. A cylinder 256 connected at opposite ends to the previously described lines 102 and 104 operates the rod 258 which, in turn, reciprocates the ladle 260 carried at the upper end of the rod. The handle of the ladle has a downwardly stepped portion 262 such that the cup 264 is disposed substantially lower than the uppermost portion of the rod 258 such that when the rod 258 is fully retracted, the cup will project well below the surface of the liquid coating in the deep dished reservoir portion 266 in the trough. The shallow portion 268 of the trough serves as a drip pan.

The novelty is then passed through the passage 240 for hardening the coated material, and upon emerging from the freezing compartment is discharged in the manner as set forth previously. The complete cycle of operation, of course, then repeats itself insofar as each individual mold is concerned.

Of course, different types of novelties may be made by changing the particular shape of mold utilized, the molds being easily removable for this purpose.

Any suitable mechanism may be provided for taking up slack in the chains, for example, a worm shaft 270 projecting through the side wall and provided with a hand wheel 272 is threadedly engaged with a nut member 274 rigidly secured to the machine. The shaft 276 to which the sprockets 28 and 32 are secured is received in bearing members 278 and 280 at its upper and lower ends, respectively. The bearing members are so mounted as to permit the shaft 276 to shift slightly with respect to the machine under action of the tension spring 282 connected between the end of the worm shaft and shaft 276. As stated, this structure is merely exemplary of the type of tensioning mechanism which may be used.

From the foregoing, the construction and operation of the device will be readily understood and further explanation is believed to be unnecessary. However, since

What is claimed as new is as follows:

1. In a confection machine a cold air freezing compartment, first and second chain assemblies each having a portion within said compartment and a portion outside said compartment, said first chain assembly having a series of spaced molds carried thereby and adapted to receive ice cream mix, said first chain assembly with said molds attached extending through said freezing compartment to freeze the mix in said molds, holder means associated with said first chain assembly and each mold for holding a stick partially within the molds for freezing the stick in said mix, said second chain assembly having a length of said portion outside of said compartment overlying and gradually inclining away from a length of said portion of the first chain outside of said compartment, means on said second chain assembly for grasping an ice cream confection stick frozen in said mix in the molds as said length of the second chain portion passes over said length of the first chain portion outside of said freezing compartment, and means for effecting movement of said chain assemblies whereby said length of said portions of said chains move in the same general direction.

2. In a confection machine according to claim 1 including means disposed exteriorly of said freezing compartment for sequentially filling said molds.

3. In a confection machine according to claim 1 including means disposed exteriorly of said freezing compartment for sequentially filling said molds and mold heating means disposed exteriorly of said freezing compartment adjacent said portion of the first chain outside of said compartment for heating said molds.

4. In a confection machine a cold air freezing compartment, a first endless chain having a portion inside and a portion outside said compartment, a series of spaced sprockets about which said chain is trained, a series of spaced molds carried by said first chain, means for sequentially filling said molds with ice cream, holder means associated with said first chain and each mold for holding a stick partially within the molds, a second endless chain having a portion inside and a portion outside said compartment, said second chain having a length of said portion outside of said compartment overlying and gradually inclining away from a length of said portion of said first chain outside of said compartment, means on said second chain for grasping an ice cream confection stick and removing the attached frozen confection from its associated mold at the position of incline of said lengths of chains, and means for effecting movement of said chains whereby said lengths of said portions of said chains move in the same general direction.

5. In a confection machine a first endless chain, a series of spaced sprockets about which said chain is trained, a series of spaced apart molds carried by said chain, holder means associated with said first chain and each mold for holding a stick partially within the molds, a second endless chain having a length of a portion thereof overlying and inclined gradually away from a length of a portion of said first chain, means for effecting simultaneous instep movement of said first nad second chains whereby said lengths of said portions of said chains move in the same general direction, a cam track adjacent said second chain and in spaced position to said lengths of said chains at their starting point of incline gradually away from each other, means on said second chain for grasping an ice cream confection stick, said last named means having a portion for engagement with said cam track for actuation of the grasping means to grasp a stick, said ice cream confection stick being withdrawn from said holder means and mold associated with the first chain as said length of the second chain moves away from said length of the first chain.

6. In a food freezing machine a freezing compartment, first and second chain assemblies each having a first and a second portion thereof with at least the first portion thereof passing through said freezing compartment, said first chain assembly having a series of spaced individual food portion carriers attached thereto and adapted to receive individual food portions, said second portion of the second chain overlying and gradually inclined away from said second portion of the first chain, spaced apart means on the second chain assembly for grasping an individual food portion carried by said carriers on the first chain assembly as said second portion of the second chain assembly inclines gradually away from said second portion therebelow of the first chain, and means for effecting movement of said chain assemblies whereby said second portions of each chain move generally in the same direction.

References Cited in the file of this patent

UNITED STATES PATENTS

| | | |
|---|---|---|
| 1,210,662 | McPherson | Jan. 2, 1917 |
| 1,795,982 | Warner | Mar. 10, 1931 |
| 1,854,551 | Kronborg et al. | Apr. 19, 1932 |
| 1,923,663 | Coda | Aug. 22, 1933 |
| 1,960,456 | Robb | May 29, 1934 |
| 2,190,581 | Wineman | Feb. 13, 1940 |
| 2,455,127 | Laxo | Nov. 30, 1948 |
| 2,563,584 | Crookston | Aug. 7, 1951 |
| 2,625,120 | Eddy et al. | Jan. 13, 1953 |